United States Patent
Smith (10) Patent No.: US 9,440,252 B2
(45) Date of Patent: Sep. 13, 2016

(54) APPLICATOR GUN WITH SUBSTANTIALLY STRAIGHT-THROUGH FLOW PATHS

(71) Applicant: Gary Alonzo Smith, Huntington Beach, CA (US)

(72) Inventor: Gary Alonzo Smith, Huntington Beach, CA (US)

(*) Notice: Subject to any disclaimer, the term of this patent is extended or adjusted under 35 U.S.C. 154(b) by 0 days.

(21) Appl. No.: 14/717,920

(22) Filed: May 20, 2015

(65) Prior Publication Data
US 2015/0336128 A1 Nov. 26, 2015

Related U.S. Application Data

(60) Provisional application No. 62/000,702, filed on May 20, 2014.

(51) Int. Cl.
*B05B 7/02* (2006.01)
*B05C 17/005* (2006.01)
*B05C 17/015* (2006.01)

(52) U.S. Cl.
CPC ....... *B05C 17/00553* (2013.01); *B05C 17/005* (2013.01); *B05C 17/00576* (2013.01); *B05C 17/015* (2013.01)

(58) Field of Classification Search
CPC ..... B05B 1/1636; B05B 7/0408; B05B 9/01; B05B 12/002
USPC ................. 239/525, 526, 569–571
See application file for complete search history.

(56) References Cited

U.S. PATENT DOCUMENTS

| | | | | |
|---|---|---|---|---|
| 7,789,327 B2* | 9/2010 | Micheli | ..................... | B05B 7/02 239/290 |
| 8,596,555 B2* | 12/2013 | Thompson | ................ | B05B 9/01 239/152 |
| 2004/0065755 A1* | 4/2004 | Turnbull | ................... | B05B 7/02 239/526 |
| 2007/0095939 A1* | 5/2007 | Saunders | .............. | B05B 1/1636 239/312 |
| 2007/0267523 A1* | 11/2007 | Roumanis | ............. | B05B 7/0408 239/526 |
| 2010/0108784 A1* | 5/2010 | Drozd | ................... | B05B 12/002 239/526 |

* cited by examiner

*Primary Examiner* — Davis Hwu
(74) *Attorney, Agent, or Firm* — Myers Andras LLP; Joseph C. Andras (57) ABSTRACT

Disclosed is an improved applicator gun for mixing two materials passed through the gun under pressure, an A material and a B material, usually a resin and a hardener. The improved gun has substantially straight-through flow paths that beneficially permits the gun to be used with high viscosity materials and/or highly filled materials (large particles) and that beneficially minimize the effect of the pump "wink" associated with pump cycles. The preferred gun is air actuated, so it includes a valve body, a cylinder body for using pneumatic pressure to open and close the valve body, and a trigger body for selectively providing high pressure shop air to the cylinder body. The longitudinal axis of the cylinder body's cylinder and associated piston are uniquely offset from the plane containing the A- and B-paths so that the two paths can pass substantially straight through the cylinder body, and then through the valve body, prior to exiting the tip of the spray gun.

4 Claims, 7 Drawing Sheets

FIG. 6b
Fluid Section Assembly

APPLICATOR GUN WITH SUBSTANTIALLY STRAIGHT-THROUGH FLOW PATHS

CROSS-REFERENCES TO RELATED APPLICATIONS

This non-provisional patent application claims the benefit of provisional patent application No. 62/000,702, filed on May 20, 2014.

BACKGROUND OF THE INVENTION

1. Field of the Invention

The present invention relates generally to applicator guns that are often used for dispensing two-part materials and, more particularly, to an applicator gun with straight-through flow paths or lumens.

2. Description of Related Art

Figure 1:
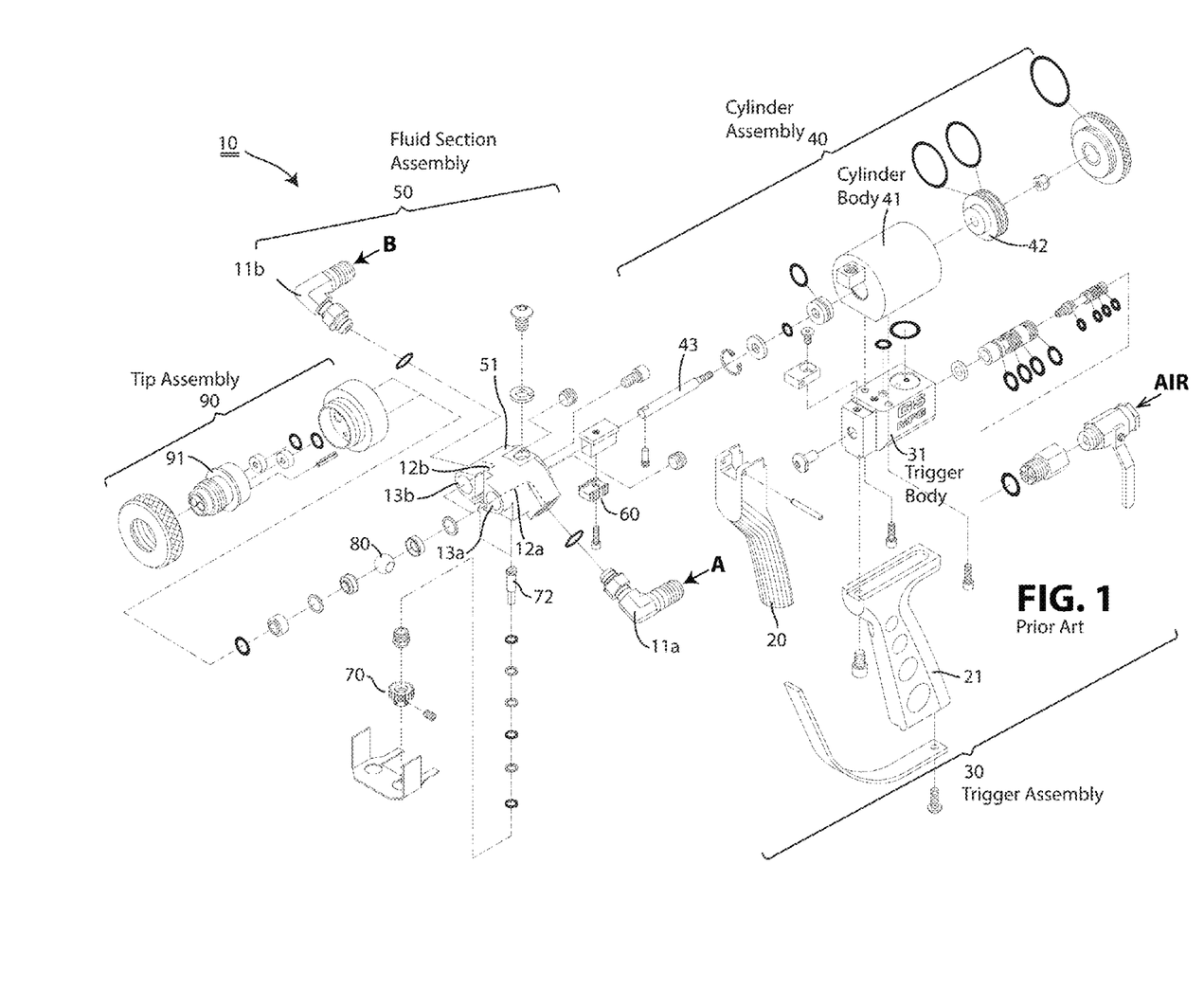
FIG. 1 shows an exploded view of a prior art applicator gun 10 having right-angle flow paths 11a, 12a and 11b, 12b for the A & B materials.
Figure 2:
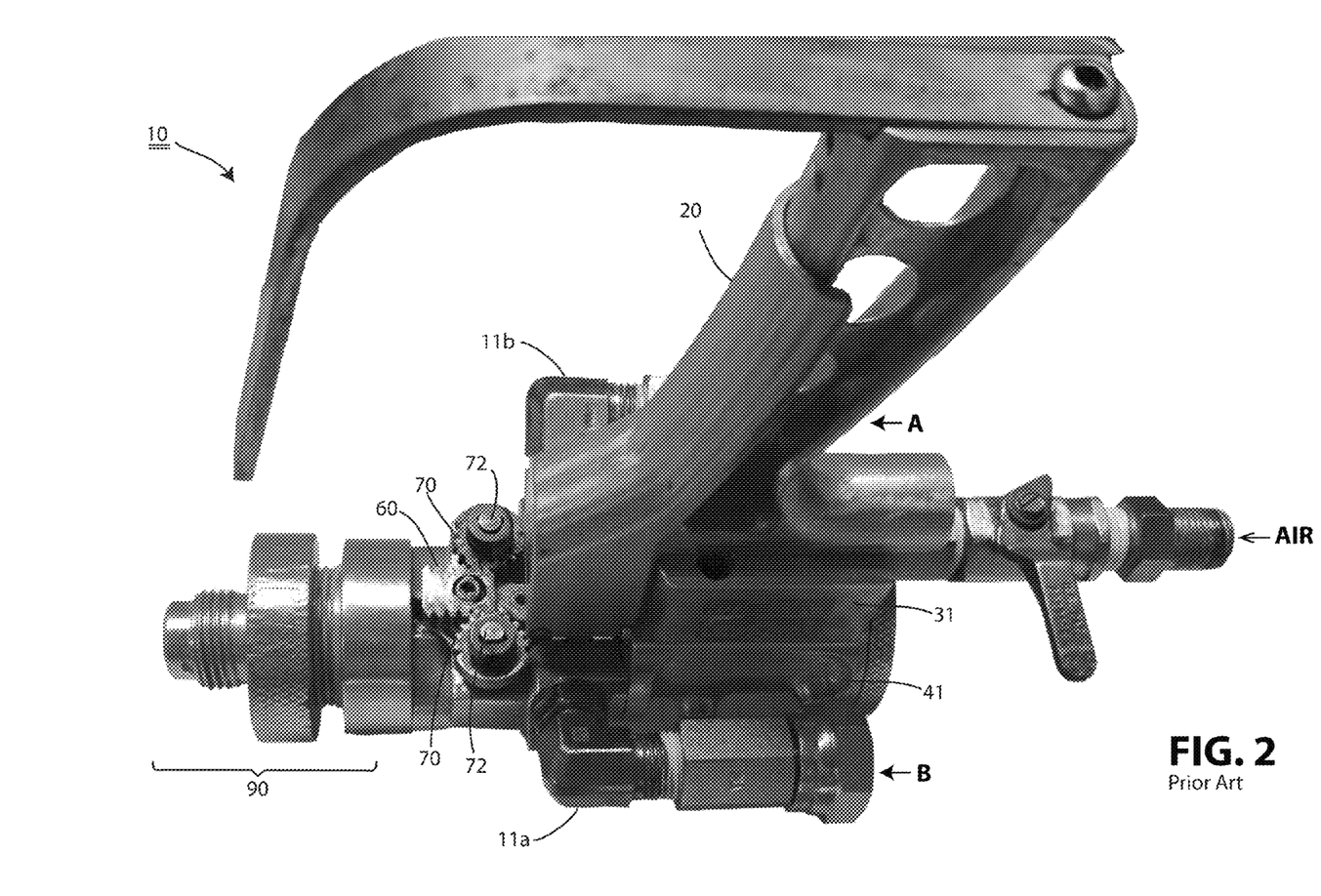
FIG. 2 is a close-up view of the rack and pinion mechanism 60, 70 on the underside of the gun's upper assembly, the A and B flow being from left to right, each flow path including a pair of right-angle turns.
Figure 3:
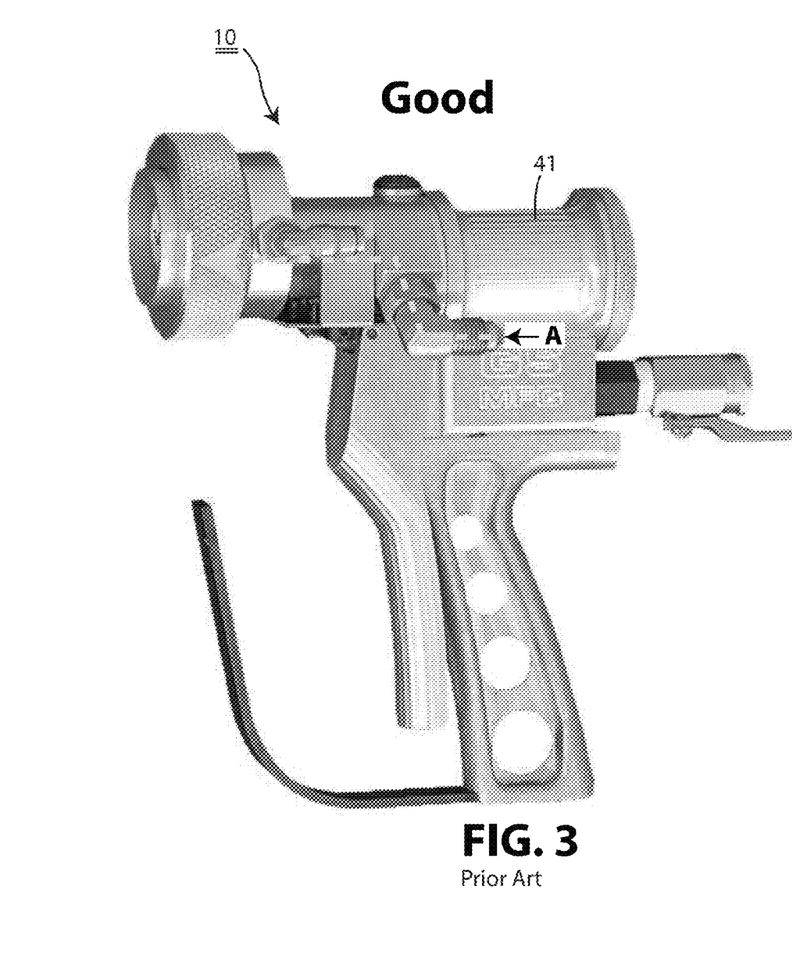
FIG. 3 is a left side view of a prior art applicator gun 10 showing the multi-turn flow path associated with its A-side flow in heavy dashed lines, the B-side being a mirror image.

FIGS. 1 to 3 show a prior art applicator gun 10 sold by applicant's company under the X-GUN® brand, model X2002A. It features a dual rack-and-pinion gear system 60/70 that is driven by a trigger-operated air cylinder. The illustrated applicator gun 10 is often used for dispensing two-part materials A&B, consisting for example of a resin (A) and a hardener (aka catalyst) (B).

In broad strokes, the applicator gun 10 comprises a trigger assembly 30, a cylinder assembly 40, a fluid section assembly 50, and a tip assembly 90. In a bit more detail, the trigger assembly includes a handle 21 with a trigger 20 and a trigger body 31; the cylinder assembly 40 includes a cylinder body 41, a piston 42, and a rod 43; and the fluid section assembly 50 includes a valve body 51 with right-angle lumens and a pair of right-angle fittings 11a, 11b.

In FIG. 1, the applicator gun's tip assembly 90 is equipped with a simple two-port tip 91. In use, this tip 91 is used with a "static mixer" which generally comprises an elongated tube or tube assembly having a flared proximal end and internal features that mix the fluids prior to exiting. The flared end of the static mixer is connected to tip 91 with a nut that engages the threads of the tip 91 and then, when the applicator gun 10 is operated, the A and B materials flow out of the tip 91 and into the static mixer. In this embodiment, the applicator gun 10 might be used to apply a thick bead of epoxy adhesive for assembling one component to another large component.

The tip assembly 90 may have an different construction and manner of operation in other embodiments. For example, the applicator gun 10 may be used for different purposes, e.g. for application of a lower viscosity gelcoat in which case the tip assembly may comprising air fittings, apertured plates, etc, for atomizing the A- and/or B-materials just prior to mixing and/or after exiting the tip assembly 90.

The applicator gun 10 may also be used for numerous other purposes, e.g. application of higher viscosity granite spray, etc., in which case the tip assembly would be purpose-built for that function. The exact design of the tip assembly may vary from embodiment to embodiment. Common to all embodiments, however, is the need for an applicator gun 10 that delivers the A- and B-materials with an applicator gun 10 that is as compact as possible for maneuvering. Also, for purposes of reducing fatigue by those who must use the applicator gun for hours on end, it needs to be as light as possible and the operation of the trigger should require as little pressure as possible to initiate and maintain the A- and B-flows.

As best shown in FIG. 1, the A and B materials enter the applicator gun 10 through the two right-angle fittings 11a and 11b that lead into the side of the valve body 51, through two more right-angle turns 12a, 12b inside of the valve body 51, and finally exit the valve body 51 at output apertures 13a,13b. As best shown in FIG. 3, the right-angle fittings 11a, 11b were necessary to provide A- and B-attachment points in relatively wide locations on either side of the cylinder body 41.

In operation, the user pulls on the trigger 20 to control the trigger body 31 that passes high pressure shop air to the cylinder body 41 to operate an air actuated piston 42 in the cylinder body 41 that in turn operates a rod 43 that opens and closes a valve mechanism 60/70/80 in the valve body 51. As shown, the dual rack and pinion mechanism 60/70 is comprised of a two-sided rack 60, a pair of pinions 70, 70. The pinions 70 rotate corresponding ball valves 80, 80. FIG. 1 only shows one pinion 70, one ball valve 80, and associated components for the sake of simplicity, but the other side is identical.

In operation, the gear rack 60 is driven back and forth by the rod 43 to rotate the pinions 70, 70 that, via corresponding shafts 72, 72, rotate and thereby open the two ball valves 80, 80 by aligning their through-holes 81 with the flow paths leading to the output apertures 13a, 13b which, in turn, let the A & B chemicals pass through and exit the tip assembly 90 of the gun. Releasing the trigger 20 closes the ball valves 80, 80 and stops the flow of the A & B materials.

FIG. 2 is a close-up view of the rack and pinion mechanism 60/70 on the underside of the gun's upper assembly. As shown, the A and B flow is from left to right, and each flow path includes a pair of right-angle turns (i.e. 11a, 12a and 11b, 12b).

FIG. 3 is a perspective view of the prior art applicator gun 10 showing the multi-turn flow path associated with its A-side flow in heavy dashed lines, the B-side being a mirror image The prior art model X2002A gun 10 and its rotating ball valves 80, 80, driven open and held open by an air piston 32 whenever the user lightly pulled the trigger 20, provided significant durability and ease-of-operation benefits relative to other applicator guns that used conventional needle valves that were manually opened against a spring force and maintained in that state by the user's grip alone. The X2002A, moreover, eliminated the need to use troublesome needle valves and related seats and, in particular, featured ball valves 80, 80 that are fully open when opened, whereas the needle valves inherently left a narrow, tapered part of the needle in the flow path.

The model X2002A gun 10 offered valve-related flow advantages, but it still exhibited some flow-related short-comings in certain more-demanding applications. For example, when relatively bulky, crushed materials are mixed with the resin to replicate the appearance of granite countertops (e.g. GRANICOAT® or other sprayable granite coatings and coring materials), the crushed materials may occasionally get trapped in the non-straight A & B flow paths—see the right-angle fittings and right-angle flow paths through the central valve body 50 of FIGS. 1 and 2 (i.e. 11a, 12a and 11b, 12b).

Because of the right-angle flow paths, with two bends on each side, higher than ideal pump pressures were also required to move the relatively bulky materials through the gun, even if flow continued without material becoming trapped. Finally, because of the associate back pressure, the right-angle flow paths would inherently exaggerate the magnitude of the so-called "wink," i.e. the periodic drop in pressure and corresponding drop in spray volume associated with pump transitions.

There remains a need, therefore, for an improved applicator gun with straight-through flow paths.

SUMMARY OF THE INVENTION

In a first aspect of the invention, an embodiment resides in an improved applicator gun for mixing two materials passed through the applicator gun under pressure, an A material and a B material, usually a resin and a hardener. The improved applicator gun has substantially straight-through flow paths that beneficially permit the gun to be used with high viscosity materials and/or highly filled materials (large particles) and that beneficially minimize the effect of the pump "wink" associated with pump cycles. The preferred gun is air actuated, so it includes a valve body, a cylinder body for using pneumatic pressure to open and close the valve body, and a trigger body for selectively providing high pressure shop air to the cylinder body. The longitudinal axis of the cylinder body's cylinder and associated piston are uniquely offset from the plane containing the A- and B-paths so that the two paths can pass substantially straight through the cylinder body, and then through the valve body, prior to exiting the tip of the spray gun.

The invention relates to an applicator gun having substantially straight-through A- and B-fluid flow paths or lumens. A preferred embodiment comprises: a handle; a trigger that is moveable relative to the handle; a trigger assembly that receives shop air and is operatively connected to the trigger for selectively passing the shop air onward; a cylinder assembly for receiving the shop air forwarded by the trigger assembly, the cylinder assembly having a proximal end and a distal end and comprising a cylinder, a piston, and a connecting rod having a proximal end and a distal end, the piston moving within the cylinder in the presence of shop air, and the proximal end of the connecting rod connected to and thereby moving with the piston; a fluid assembly having a proximal end and a distal end, the proximal end of the fluid assembly attached to the distal end of the cylinder assembly, the fluid assembly comprising a valve body with A- and B-valve body lumens that each have a proximal input end and an distal output end and that each pass substantially straight-through the valve body, a two-sided gear rack, first and second pinions that operatively engage opposite sides of the gear rack and rotate in response to the gear rack's movement, and first and second ball valves that are interposed within the A- and B-valve body lumens and that are attached to and rotate with the pinions between an open position and a closed position, the gear rack attached to the distal end of the connecting rod and configured for reciprocal movement in response to the piston moving within the cylinder; the cylinder assembly's cylinder and piston being sufficiently offset below the fluid assembly's A- and B-lumens such that the proximal input ends of the A- and B-lumens that pass substantially straight through the valve body are accessible at a proximal end of the valve body and above the cylinder and piston.

Ideally, for purposes of bringing the A- and B-lumens further back on the applicator gun, the cylinder body also has related A- and B-cylinder body lumens that each have a proximal input end and an distal output end and pass substantially straight-through the cylinder body, the distal end of the A- and B-cylinder body lumens aligned with the proximal end of the A- and B-valve body lumens to form two substantially straight flow paths through the cylinder body and the valve body.

BRIEF DESCRIPTION OF THE FIGURES

The present invention has other objects and features of advantage which will be more readily apparent from the following description of the best mode of carrying out the invention and the appended claims, when taken in conjunction with the accompanying drawings, in which:

DETAILED DESCRIPTION OF THE PREFERRED EMBODIMENTS

While the present invention will be described with reference to one or more embodiments, the description is merely illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

FIGS. 4 to 11 illustrate a presently preferred embodiment of an improved applicator gun 110 having straight-through flow paths 112a, 112b according to a first preferred embodiment of the present invention. In general, the improved applicator gun 110 operates as follows:

gun is used for dispensing 2-part materials, typically resin and hardener (A & B) or, in some cases, for dispensing a single material delivered through both flow paths;

A & B materials enter the gun 100 thru fittings 146a, 146b marked accordingly (rear of gun)

air actuated piston 142 (controlled by pulling trigger 120) operates a dual rack & pinion design 160/170 (see FIGS. 6a and 6b) opening two ball valves 180, 180 which let the A & B chemicals pass substantially straight through, and therefore, substantially unobstructed releasing trigger closes ball valves 180, 180, stopping flow of material The improved applicator gun 100 offers the following improvements and advantages relative to the prior art:

A & B materials enter thru the rear of the gun and pass substantially straight-through allowing for an unobstructed exit, as opposed to the prior art design which required two 90 degree turns. In order to make this possible, the inventor designed an offset piston 142 within the trigger/cylinder body 130/140 to allow the delivery tubes 155a, 155b to be placed slightly above and around the piston 142 (see FIG. 7)

the "straight thru" design allows A & B materials with high viscosities and highly filled materials (large particles) to pass thru the gun easily as opposed to plugging in 90 degree turns.

other gun manufacturers use a needle and seat design to stop A & B flow which inherently does not have a "straight thru" design.

tests have shown the "straight thru" design lowers fluid pressures and reduces the "wink" caused by the fluid pump shifting directions.

having the A & B materials enter from the rear of the gun allows the gun to be more maneuverable and a much more slender design to fit in tight places.

Figure 4:
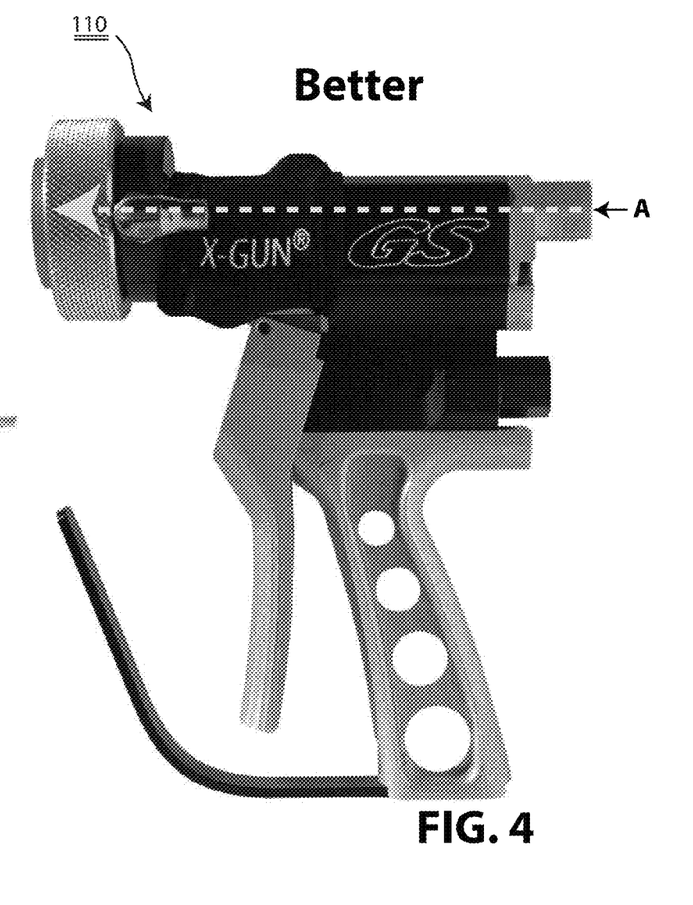
FIG. 4 is a left side view of an improved applicator gun 110 according to a presently preferred embodiment of the invention showing the straight-through flow path associated with its A-side flow in heavy dashed lines, the B-side being a mirror image.

The construction and overall operation of the preferred embodiment is best understood with reference to the figures. FIG. 4 is a left side view of the improved applicator gun 110 according to a presently preferred embodiment of the invention showing the straight-through flow path associated with its A-side flow in heavy dashed lines, the B-side being a mirror image.

Figure 5:
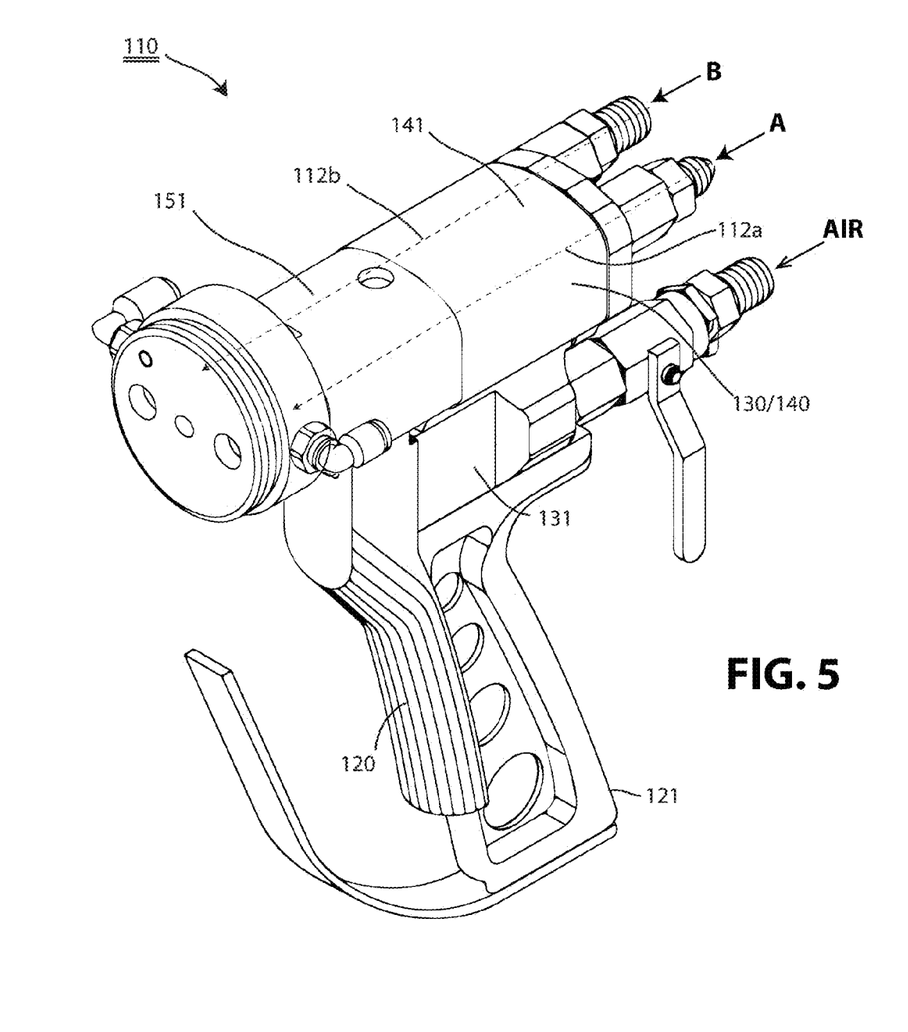
FIG. 5 is a perspective view of the first preferred spray gun 110 in an assembled state, showing its general construction and nature of the A-side and B-side straight-through flow paths 112a, 112b that allow the gun to be effectively used with high viscosity materials and/or highly filled materials (large particles) and that minimize the effect of the pump "wink"

FIG. 5 is a perspective view of the first preferred spray gun 110 in a fully assembled state, showing its general construction and beneficial nature of the A-side and B-side straight-through flow paths 112a, 112b that allow the gun to be effectively used with high viscosity materials and/or highly filled materials (large particles) and that minimize the effect of the pump "wink".

Figure 6A:
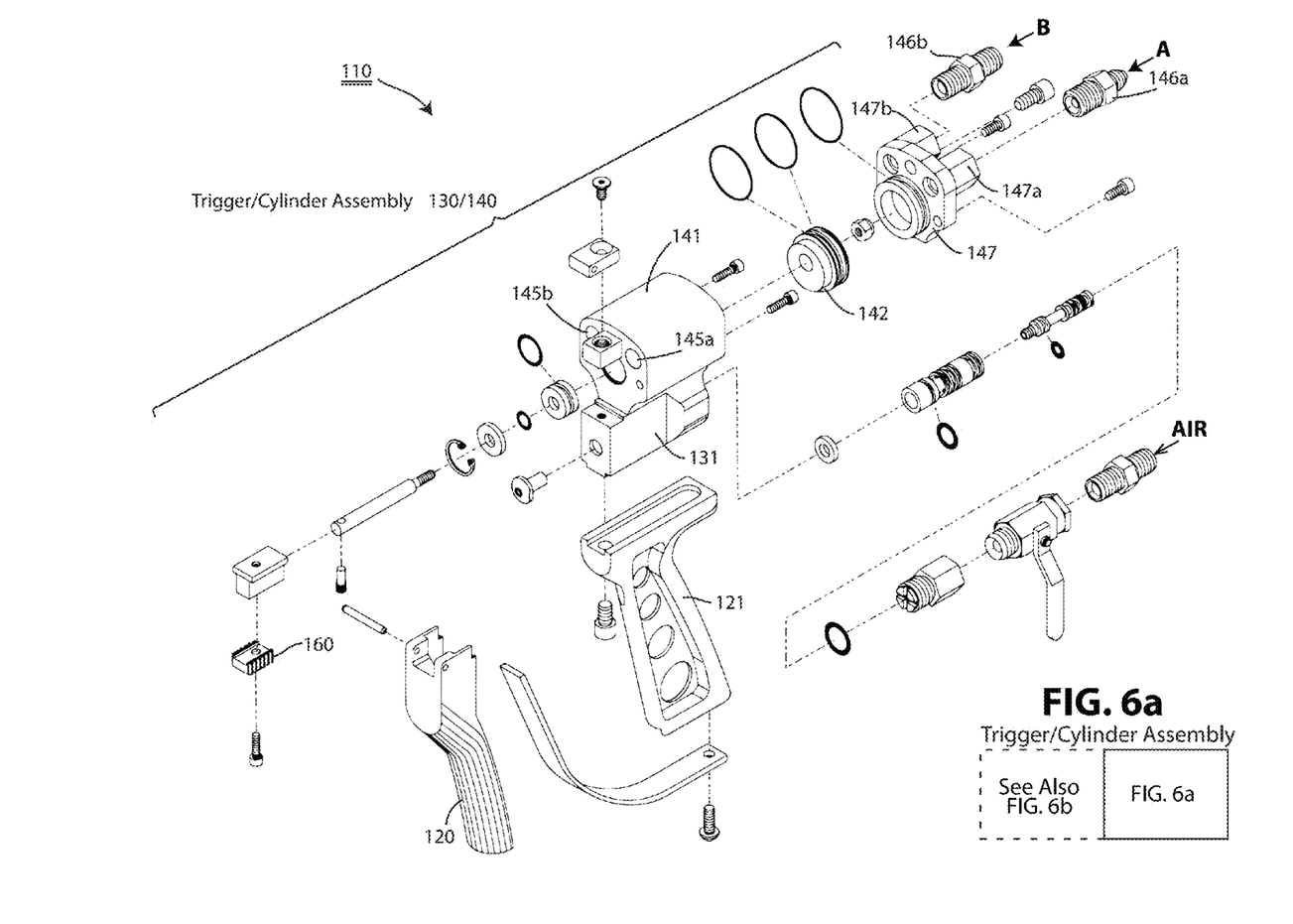
FIG. 6a is an exploded view of a first section of the improved spray gun 110 and generally shows the trigger/cylinder assembly 130/140 with its trigger 120 and associated handle 121, trigger body 131, and integrally formed cylinder body 141, the cylinder body having substantially straight-through sleeve supports passages 145a, 145b.

FIG. 6a is an exploded view of a first section of the improved spray gun 110 and generally shows the trigger/cylinder assembly 130/140 with its trigger 120 and associated handle 121, trigger body 131, and integrally formed cylinder body 141, the cylinder body having substantially straight-through sleeve support passages or lumens 145a, 145b. An end cap 147 is provided for sealing the piston 142 within the cylinder (not visible, but see item 144 in FIGS. 10 and 11) and for providing threaded ports 147a, 147b that lead to the sleeve support passages 145a, 145b.

Figure 6B:
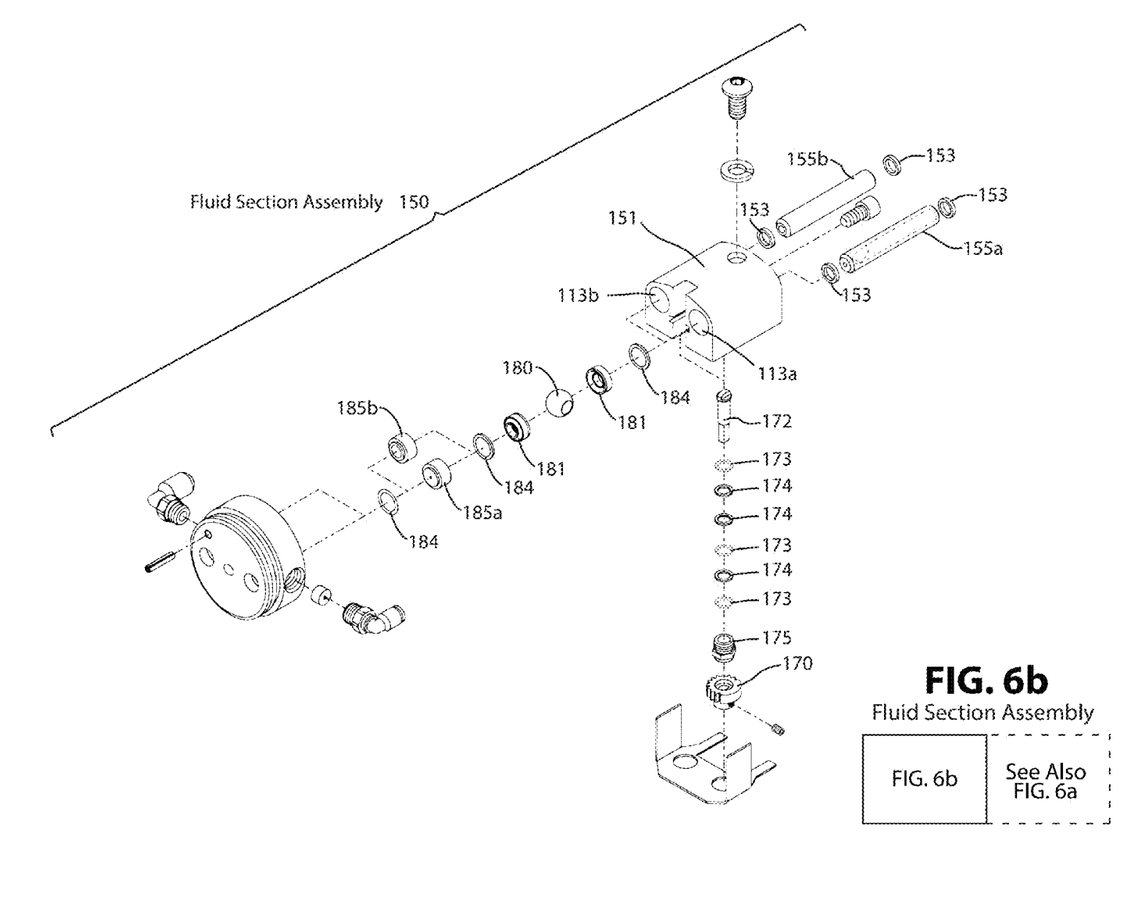
FIG. 6b is an exploded view of a second section of the improved spray gun 110 and generally shows the fluid section assembly 150 with its valve body 151 and a pair of substantially straight-through fluid passage sleeves or delivery tubes 155a, 155b.

FIG. 6b is an exploded view of a second section of the improved spray gun 110 and generally shows the fluid section assembly 150 with its valve body 151 and a pair of substantially straight-through fluid passage sleeves or delivery tubes 155a, 155b.

As can be appreciated from viewing FIG. 6b in conjunction with FIG. 6a, the valve body 151 attaches to the cylinder body 141 and the delivery tubes 155a, 155b pass through the cylinder body 141, on either side of the cylinder, connecting the fittings 146a, 146b to the exit ends 113a, 113b via delivery tubes 155a, 155b (see FIG. 6b) located in the cylinder body 141. A number of Teflon washers 153 are present to seal the ends of the delivery tubes 155a, 155b when the valve body 151 and cylinder body 141 are assembled together.

The delivery tubes 155a, 155b are shown with different sized exit apertures that are selected to provide a desired mix ratio between A and B components based on chemical requirements and viscosity. For similar reasons, delivery tube 155a is shown with an optional metal rod insert (dashed lines) that reduces the area for fluid flow in the A-path, thereby creating more back pressure and reducing the flow, e.g. of the catalyst. The distal end of the insert is angled so that the insert does not interfere with the delivery tube's exit aperture.

In operation, the rack 160 in FIG. 6a turns the pinions 170 in FIG. 6b. The pinions 170 are connected to the ball valves 180 via a step 172. To prevent leakages around the stem 172, a stem packing is provided in the form of metal washers 173 and Teflon washers 174 that are compressed by a nut 175. Many of the illustrated components shown to provide one with a full and complete understanding, but they may or may not be present in a particular embodiment.

Inside of the valve body 151, each ball valve 180 is held between a pair of seats 181, 181, and a corresponding pair of Teflon® washers. A stainless steel flow-control insert 185a, 185b and another Teflon® washer are provided downstream of each ball valve. In the illustrated embodiment, insert 185a has a small orifice in order to achieve a desired ratio of catalyst to resist as desired. In other words, insert 185a operates as a restrictor.

Figure 7:
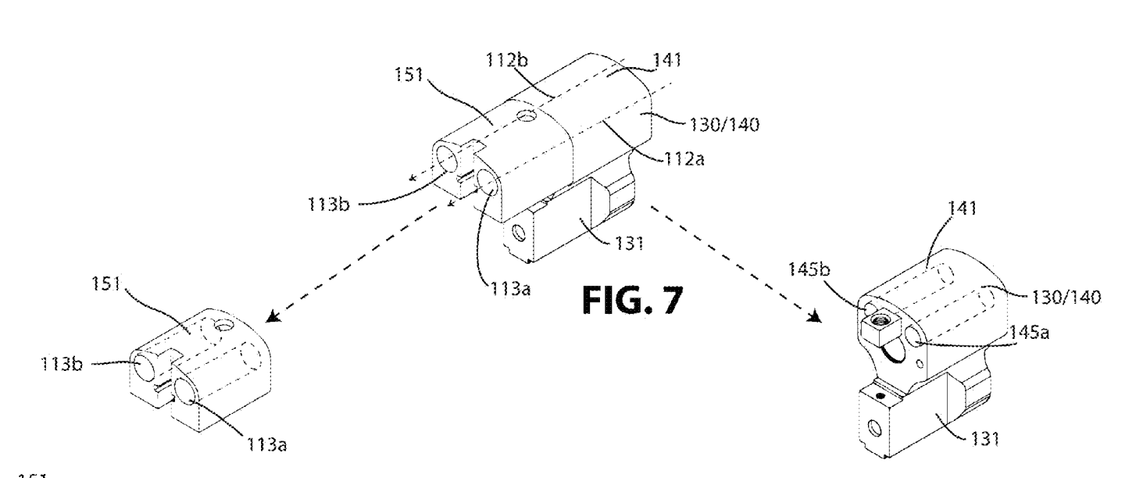
FIG. 7 is a perspective view of the trigger/cylinder assembly 130/140 and valve body 151, shown an in assembled state, and then separated for further understanding as to how the substantially straight-through flow paths 112a, 112b are located above and on either side of the air cylinder in the trigger/cylinder assembly 130/140.

FIG. 7 is a perspective view of the trigger/cylinder assembly 130/140 and valve body 151, shown an in assembled state, and then separated for further understanding as to how the substantially straight-through flow paths 112a, 112b are located above and on either side of the air cylinder in the trigger/cylinder assembly 130/140. As best shown by the dashed lines in the separated bodies, the straight-through flow paths 112a, 112b are formed from a pair of A- and B-valve body lumens 113a, 113b and an aligned pair of A- and B-cylinder body lumens 145a, 145b.

Figure 8:
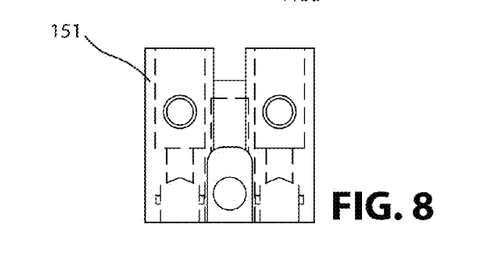
FIG. 8 is a bottom view of the valve body 150. In this view, one can see the substantially straight-through nature of the two flow paths.

FIG. 8 is a bottom view of the valve body 150.

Figure 9:
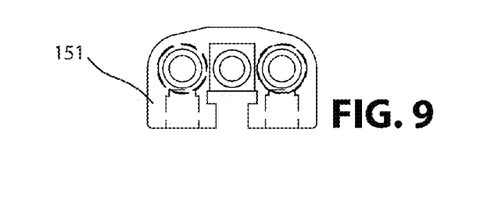
FIG. 9 is a distal end view of the valve body 150. In this view, one can also see the substantially straight-through nature of the two flow paths.

FIG. 9 is a distal end view of the valve body 150.

Figure 10:
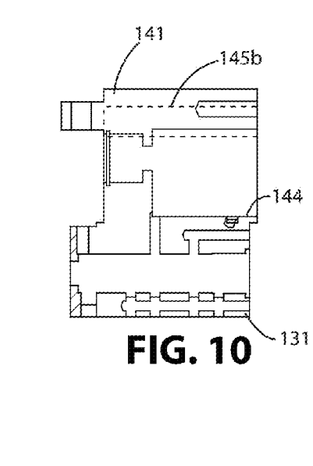
FIG. 10 is a side view of the trigger/cylinder assembly 130/140.

FIG. 10 is a side view of the trigger/cylinder assembly 130/140.

Figure 11:
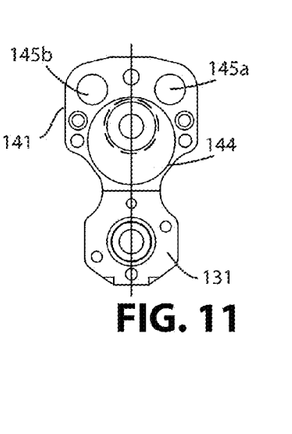
FIG. 11 is a proximal end view of the trigger/cylinder assembly 130/140.

FIG. 11 is a proximal end view of the trigger/cylinder assembly 130/140. In this embodiment, as shown, the substantially straight-through sleeve supports passages 145a, 145b are in a plane that is above the longitudinal axis of the cylinder and related piston within the cylinder body 141. Of significance, the straight-through sleeve support passages 145, 145b are accessible from a proximal end of the cylinder body 141, and are located above the cylinder 144, rather than being posited wide and off to the sides and then leading to not one, but two right-angle turns.

Many modifications can be made without departing from the spirit and scope of the claimed invention. In the preferred embodiment, for example, the trigger body 131 and cylinder body 141 are integrally formed from a single block of metal (e.g. aluminum), but the two assemblies could be separately formed and then connected to one another with suitable fasteners.

As yet another example, the flow paths 112a, 112b in the preferred embodiment are formed in the cylinder body 140, but in other embodiments, the flow paths 112a, 112b could reside in a different locations, or even be completely outside of a differently shaped cylinder body without departing from the scope and spirit of the invention.

The invention claimed is:

1. An applicator gun comprising:
    a handle;
    a trigger that is moveable relative to the handle;
    a trigger assembly that receives shop air and is operatively connected to the trigger for selectively blocking or passing the shop air;
    a cylinder assembly for receiving the shop air selectively passed by the trigger assembly, the cylinder assembly having a proximal end and a distal end and comprising a cylinder, a piston, and a connecting rod having a proximal end and a distal end, the piston moving one way within the cylinder in the presence of shop air and returning an opposite direction in the absence of shop air, the proximal end of the connecting rod connected to and thereby moving with the piston;
    a fluid assembly having a proximal end and a distal end, the proximal end of the fluid assembly attached to the distal end of the cylinder assembly, the fluid assembly comprising a valve body with A- and B-valve body lumens that each have a proximal input end and an distal output end and that each pass substantially straight-through the valve body, a two-sided gear rack, first and second pinions that operatively engage opposite sides of the gear rack and rotate in response to the gear rack's movement, and first and second ball valves that are interposed within the A- and B-valve body lumens and that are attached to and rotate with the pinions between an open position and a closed position, the gear rack attached to the distal end of the connecting rod and configured for reciprocal movement in response to the piston moving within the cylinder;
    the cylinder assembly's cylinder being sufficiently offset below the fluid assembly's A- and B-valve body lumens such that the proximal input ends of the A- and B-valve body lumens are directly accessible above the cylinder at a proximal end of the valve body.

2. The applicator gun of claim 1 wherein further comprises:
    the cylinder body having A- and B-cylinder body lumens that each have a proximal input end and an distal output end and pass substantially straight-through the cylinder body, the distal end of the A- and B-cylinder body lumens aligned with the proximal end of the A- and B-valve body lumens to form two substantially straight flow paths through the cylinder body and the valve body.

3. The applicator gun of claim 2 further comprising:
    A- and B-feed tubes located within the A- and B-cylinder body lumens; and
    an end cap attached to the proximal end of the cylinder body for securing the A- and B-feed tubes within the cylinder body, the end cap further providing threaded ports for connecting material feed lines to substantially straight flow paths formed by the A- and B-cylinder body lumens and the A- and B-valve body lumens.

4. The applicator gun of claim 1 wherein the trigger body of the trigger assembly and the cylinder body of the cylinder assembly are integrally formed from a single block of material.

* * * * *